(No Model.) 3 Sheets—Sheet 1.

J. H. BLESSING.
APPARATUS FOR PURIFYING WATER.

No. 352,944. Patented Nov. 23, 1886.

Witnesses:
S. B. Brown,
W. M. Brown.

Inventor:
JAMES H. BLESSING,
by William H. Low,
Attorney.

(No Model.) 3 Sheets—Sheet 2.
J. H. BLESSING.
APPARATUS FOR PURIFYING WATER.
No. 352,944. Patented Nov. 23, 1886.
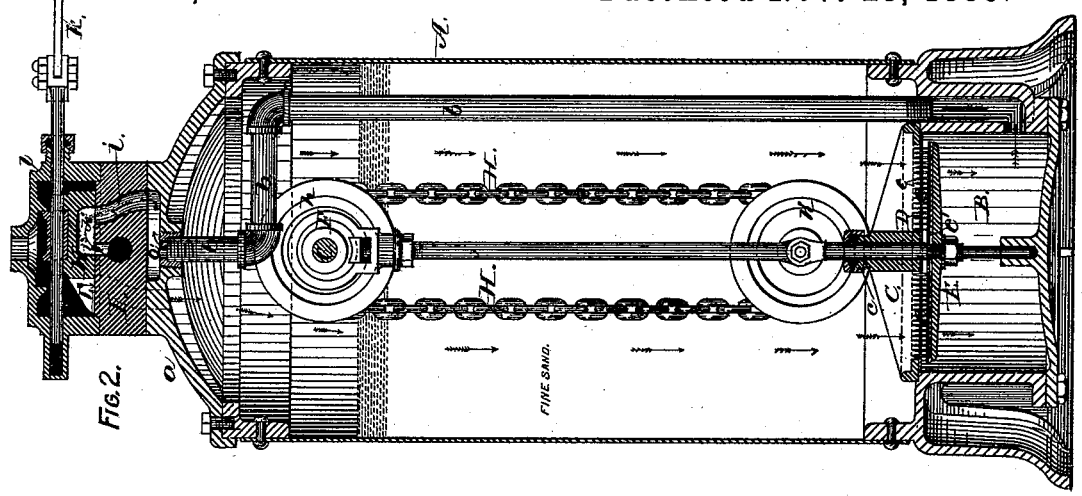
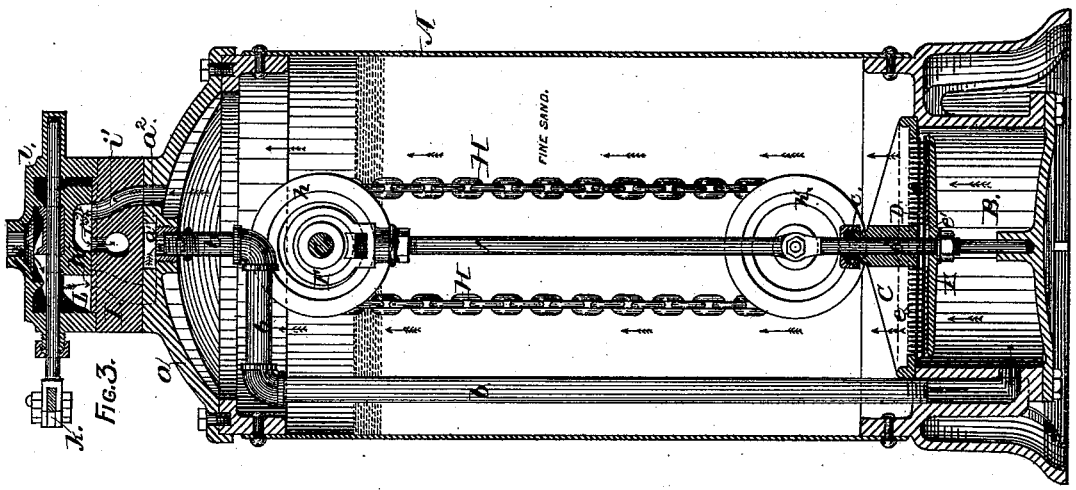
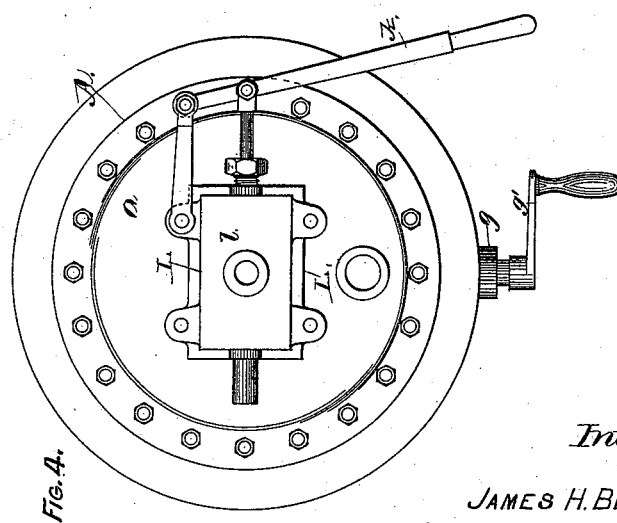
Witnesses:
S. B. Brewer
W. W. Brown
Inventor:
James H. Blessing,
by William N. Low,
Attorney.

(No Model.) 3 Sheets—Sheet 3.

J. H. BLESSING.
APPARATUS FOR PURIFYING WATER.

No. 352,944. Patented Nov. 23, 1886.

Witnesses:
S. B. Brewer,
H. M. Brown.

Inventor:
James H. Blessing,
by William N. Lord,
Attorney.

UNITED STATES PATENT OFFICE.

JAMES H. BLESSING, OF ALBANY, NEW YORK.

APPARATUS FOR PURIFYING WATER.

SPECIFICATION forming part of Letters Patent No. 352,944, dated November 23, 1886.

Application filed August 19, 1886. Serial No. 211,246. (No model.)

*To all whom it may concern:*

Be it known that I, JAMES H. BLESSING, of the city and county of Albany, in the State of New York, have invented new and useful Improvements in Apparatus for Purifying Water, of which the following is a specification.

My invention relates to improvements in apparatus for filtering water; and the object of my invention is to provide means for rapidly and thoroughly cleansing the water of any impurities that are held in a state of suspension therein, to afford facilities for washing the filtering media without removing the latter from the apparatus, and to secure a ready and effectual discharge of the impurities, after they are separated from the water, through a channel that is independent of the one through which the filtered water is carried off. This object I attain by means of the mechanism illustrated in the accompanying drawings, which are herein referred to, and form part of this specification, and in which—

Figure 1:
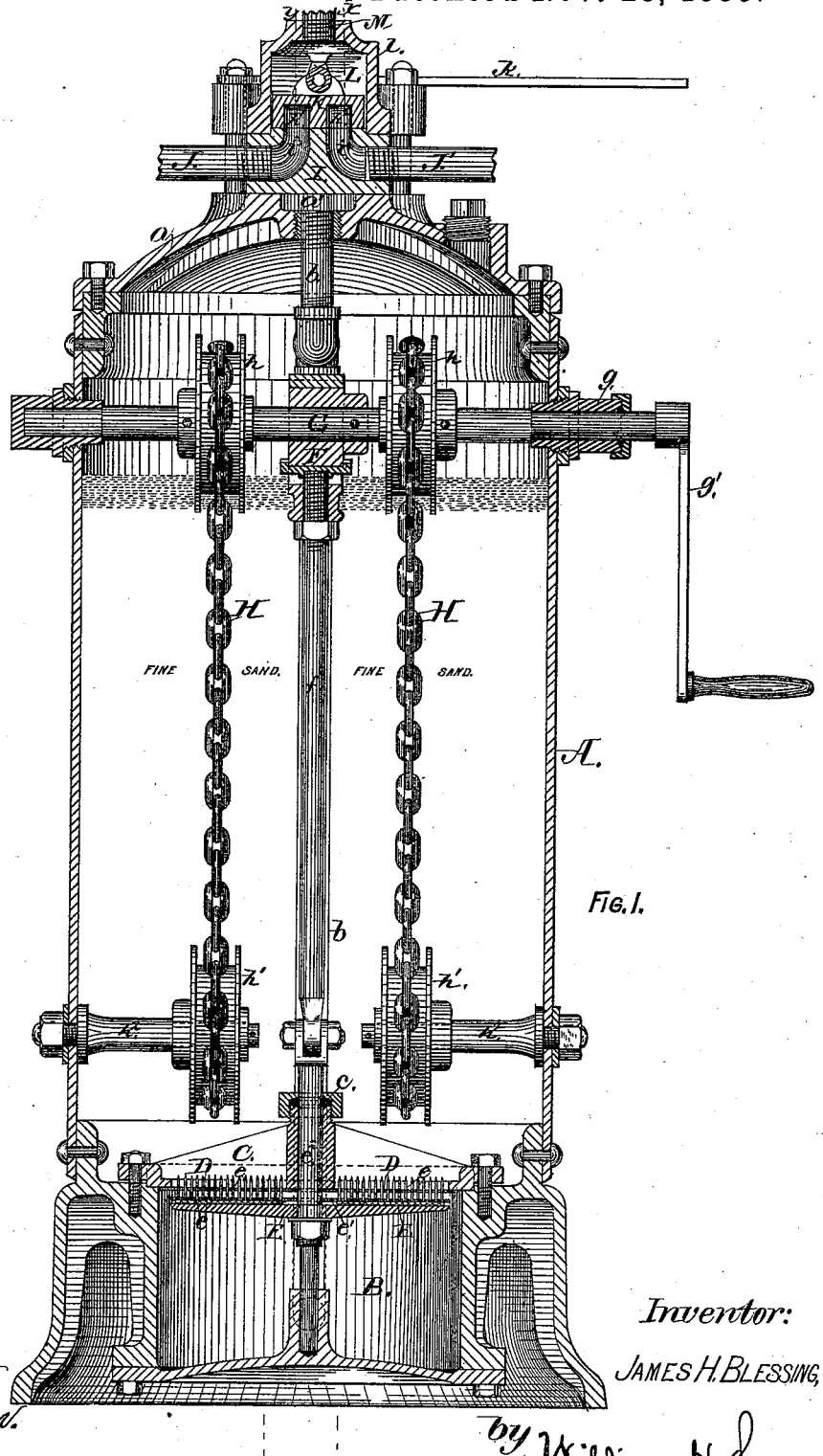
Figures 5, 6, 7:
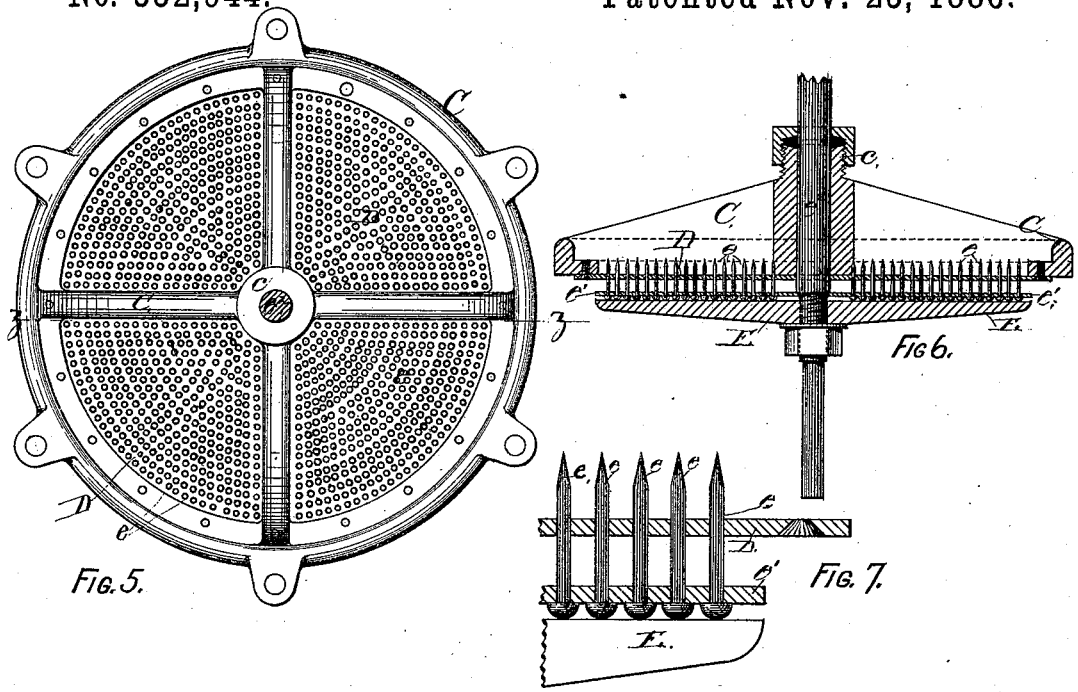
Figure 8:
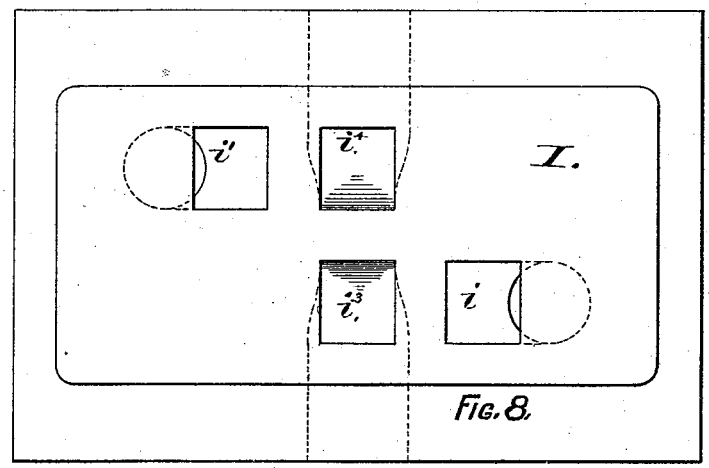
Figure 9:
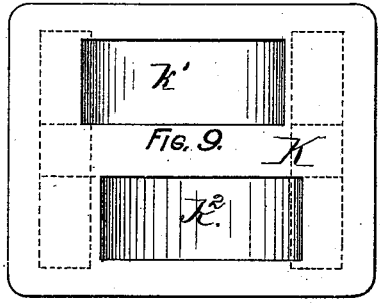

Figure 1 is a vertical section of my apparatus; Figs. 2 and 3, vertical sections of the same, taken at right angles to Fig. 1, on the lines $x\,x$ and $y\,y$, respectively; Fig. 4, a plan view of my apparatus; Fig. 5, a detached plan view of the percolating-plate and clearing device; Fig. 6, a vertical section of same at the line $z\,z$; Fig. 7, an enlarged vertical section of a portion of the same; Fig. 8, a plan view of valve-seat for the current-reversing valve, and Fig. 9 an inverted plan view of valve for same.

As represented in the drawings, A is the shell or casing of the filter, which is preferably made in a cylindrical form, and has at its lower part a chamber, B, into which the filtered water is first received, and from which said filtered water is discharged through the pipe $b$. The latter extends upward from the chamber B and is connected to the cover $a$, so as to communicate with a passage, $a'$, formed in the top of said cover.

At the bottom of the casing A, directly over the chamber B, a spider, C, is secured, and to the lower face of the latter a closely-perforated percolating-plate, D, is attached. Beneath the latter is a head, E, which carries a series of pins or plungers, $e$, equaling in number and corresponding in position to the perforations of the plate D, into which perforations said plungers are constantly retained. The diameters of said plungers should be very slightly less than the diameters of the perforations, the difference in diameters being just sufficient to allow water to ooze through the passages thus formed, but insufficient to let the finest particles of sand pass therethrough.

The plungers $e$ are preferably held in position by means of the perforated plate $e'$, which should have its holes drilled simultaneously with the plate D, in order to secure the necessary exactness. The plate $e'$ is secured to the head E by a central stem, $e^2$, which passes through the hub of the spider C. The pins or plungers $e$ may be held in the perforations of the plate D in a stationary position; but in order to obtain a removal of any deposition that might lodge in said perforations or on said plungers I preferably adapt the head E to receive an occasional reciprocation, whereby the plungers $e$ receive a slight up-and-down movement in the perforations of the plate, and the said reciprocating movements should occur when the water-currents are arranged to pass upward, (while washing the filtering media, as hereinafter described,) so that the loosened particles can be carried up and out of the casing during the operation of washing. The reciprocating motion of the head E is imparted by an eccentric, F, which has a very slight throw, and which is secured to the transverse shaft G, that extends through a stuffing-box, $g$, at the side of the casing A, and the outer end of said shaft is provided with a hand-crank, $g'$, or other means whereby a rotatory motion can be imparted thereto. The eccentric F is connected by the rod $f$ to the stem $e^2$, which slides through a stuffing-box, $c$, that is formed on the hub of the spider C.

The casing A is partially filled with a filtering media, which is preferably composed of a moderately-fine beach-sand, and in order to produce a proper separation of the particles of said media during the operation of washing any deposition of foreign matter therefrom I provide an agitator, which consists of one or more endless chains, H, that are driven by the chain-sheaves $h$, secured to the shaft G. The lower bends of said endless chains are carried around grooved sheaves $h'$, which are fitted to revolve on studs $h^2$, secured to the casing A.

I is a valve-seat provided with two independent induction-ports, $i$ and $i'$, and two independent eduction-ports, $i^3$ and $i^4$. The induction-port $i$ is arranged to communicate with the passage $a'$, and through said passage with the pipe $b$, and the induction-port $i'$ connects with the opening $a^2$, to form a passage which leads directly into the interior of the casing. The eduction-port $i^3$ connects with the pipe J, by which the filtered water is conveyed to the place where it is to be used, and the eduction-port $i^4$ connects with the waste-pipe J', through which the waste water escapes during the operation of washing the filtering media.

K is a slide-valve fitted to be moved on the valve-seat I by means of the hand-lever $k$. Said valve is provided with two independent pass-over passages, $k'$ and $k^2$. The passage $k'$ is adapted to form a communication between the induction-port $i$ and the eduction-port $i^3$, and the passage $k^2$ is adapted to form a like communication between the induction-port $i'$ and eduction-port $i^4$. The arrangement of the ports in the valve-seat and the pass-over passages in the slide-valve must be such that when the valve is moved into a position to form an open communication between either one of the induction-ports and its corresponding eduction-port the communication between the other induction-port and its corresponding eduction-port will be reciprocally closed. The valve K is inclosed in the valve-chest L and its bonnet $l$.

M is a supply-pipe through which the water is delivered into the valve-chest L.

The operation of my apparatus is as follows: The valve K being placed so that its pass-over passage $k'$ will form an open communication between the induction-port $i$ and eduction-port $i^3$, as shown in Fig. 2, the induction-port $i'$ will thus be opened to allow the water that comes into the valve-chest L to pass directly into the interior of the casing A, and from the latter the water, after it has been defecated from its impurities by passing through the filtering media, will percolate through the minute openings formed by the perforations in the plate D around the plungers $e$ into the chamber B. From the latter the purified water will pass through the pipe $b$ into the passage $a'$, and from thence through the induction-port $i$, pass-over passage $k'$, and eduction-port $i^3$ out of the pipe J to such place as it may be required. The course of the water in the process of filtration from the valve-chest until its escape from the apparatus is indicated by arrows in Fig. 2.

During the process of filtration the body of sand which composes the filtering media becomes densely impacted to such a degree that it will prevent any movement of the endless chains H therethrough. To effect the washing of the filtering media the course of the currents of water must be changed, as indicated by arrows in Fig. 3, and this change is effected by simply sliding the valve K to open the induction-port $i$, and establish a communication through the pass-over passage $k^2$ between the induction-port $i'$ and eduction-port $i^4$. When this is accomplished, the water from the valve-chest L passes down through the induction-port $i$ and passage $a'$ into the pipe $b$ and chamber B. From thence, passing through the many minute openings around the plungers $e$, it enters the body of the filtering media with sufficient force to break up the compact condition of said body and cause the particles to become separated and loosened from each other. When this occurs, the shaft G can be readily rotated, and thereby the plungers $e$ will be reciprocated to remove any deposition from said plungers and perforations in the plate D, and the endless chains H will be set in motion to produce an agitation of the particles of the filtering media, whereby the floculent matter held by said media will be set free, to be carried out of the apparatus by the escaping currents of water, which then pass through the induction-port $i'$, pass-over passages $k^2$, and eduction-port $i^4$, and out of the waste-pipe J'.

In filters as commonly constructed the reversal of the currents of water for the purpose of washing the filtering media can only be effected by the manipulation of several cocks or valves; but in my apparatus the reversal of the water-currents is effected by a single movement of the valve K.

The pins or plungers $e$ may be fitted to permanently remain in a stationary position in the perforations of the plate D, and a very satisfactory result will be obtained by such an arrangement. The most essential features connected with the use of said pins is that they must not be fitted into the perforations of the plate D so closely that water will not ooze through the joints, and the joints between the pins and perforations must not be sufficiently open to allow sand to pass therethrough.

I claim as my invention—

1. In a filtering apparatus, a perforated percolating-plate having pins or plungers inserted in its perforations, to produce minute openings through which the water will ooze, as herein specified.

2. In a filtering apparatus, the combination, with a chamber containing sand or other filtering media and a perforated percolating-plate, of a reciprocating head provided with pins or plungers adapted to slide in the perforations of said percolating-plate, as and for the purpose herein specified.

3. In a filtering apparatus which contains filtering media of granular particles, an agitator composed of a rotative shaft having chain-sheaves, and endless chains driven by said shaft, as and for the purpose herein specified.

4. In a filtering apparatus, the combination, with a filtering-chamber containing a filtering media of granular material, a percolating-plate separating said filtering-chamber from an underlying filtered-water chamber, and a pipe leading from the latter to an eduction-port, of a series of pins or plungers fitted into the perforations of the percolating-plate, to produce minute openings through which the water will ooze, and a single valve for changing the direction of the currents of water through said filtering apparatus, as herein specified.

JAMES H. BLESSING.

Witnesses:
JOHN W. WHEELOCK,
WM. H. LOW.